US012596734B2

(12) United States Patent
Sheets et al.

(10) Patent No.: US 12,596,734 B2
(45) Date of Patent: Apr. 7, 2026

(54) PARSE ARBITRATOR FOR ARBITRATING BETWEEN CANDIDATE DESCRIPTIVE PARSES GENERATED FROM DESCRIPTIVE QUERIES

(71) Applicant: Spotify AB, Stockholm (SE)

(72) Inventors: Kristen Sheets, Somerville, MA (US); Matthew McKenna, Somerville, MA (US); Yakov Kronrod, Northampton, MA (US)

(73) Assignee: Spotify AB, Stockholm (SE)

( * ) Notice: Subject to any disclaimer, the term of this patent is extended or adjusted under 35 U.S.C. 154(b) by 324 days.

(21) Appl. No.: 18/146,276

(22) Filed: Dec. 23, 2022

(65) Prior Publication Data

US 2024/0211500 A1      Jun. 27, 2024

(51) Int. Cl.
| | |
|---|---|
| *G06F 16/334* | (2025.01) |
| *G06F 16/355* | (2025.01) |
| *G06F 40/20* | (2020.01) |
| *G06F 40/205* | (2020.01) |
| *G06F 40/211* | (2020.01) |
| *G06F 40/216* | (2020.01) |

(52) U.S. Cl.
CPC ........ *G06F 16/3344* (2019.01); *G06F 16/334* (2019.01); *G06F 16/355* (2019.01); *G06F 40/20* (2020.01); *G06F 40/205* (2020.01); *G06F 40/211* (2020.01); *G06F 40/216* (2020.01)

(58) Field of Classification Search
CPC .. G06F 16/3344; G06F 16/334; G06F 40/205; G06F 40/211; G06F 40/216; G06F 40/20
See application file for complete search history.

(56) References Cited

U.S. PATENT DOCUMENTS

| | | | |
|---|---|---|---|
| 2013/0031113 A1* | 1/2013 | Feng ..................... | G06F 16/243 707/E17.014 |
| 2014/0310002 A1* | 10/2014 | Nitz ........................ | G10L 15/22 704/270.1 |
| 2015/0081279 A1* | 3/2015 | Suleman ............... | G06F 40/237 704/9 |
| 2015/0149177 A1* | 5/2015 | Kalns .................. | G10L 15/1822 704/257 |
| 2016/0225370 A1* | 8/2016 | Kannan ................... | G10L 15/18 |
| 2019/0385611 A1* | 12/2019 | Smythe .................. | G06F 40/40 |

(Continued)

*Primary Examiner* — Samuel G Neway
(74) *Attorney, Agent, or Firm* — McDonnell Boehnen Hulbert & Berghoff LLP

(57) ABSTRACT

A parse arbitrator receives a rule-based parser predictive test result indicating whether a first <intent, slots> set contains at least one predictive slot and a descriptive classifier test result indicating whether the digitized descriptive query is descriptive. The parse arbitrator instructs a fulfillment system to perform a fulfillment operation based on the first <intent, slots> set when the rule-based parser predictive test result and the descriptive classifier test result align and instructs a fulfillment system to perform a fulfillment operation based on a second <intent, slots> set when the rule-based parser predictive test result and the descriptive classifier test result do not align. The first <intent, slots> set has been generated by using a first parser to parse a digitized descriptive query and the second <intent, slots> set has been generated by using a second parser to parse the digitized descriptive query.

20 Claims, 5 Drawing Sheets

(56) References Cited

U.S. PATENT DOCUMENTS

| | | |
|---|---|---|
| 2020/0043480 A1 | 2/2020 | Shen et al. |
| 2020/0202845 A1 | 6/2020 | Jacobson et al. |
| 2020/0257856 A1 | 8/2020 | Peper et al. |
| 2021/0124805 A1* | 4/2021 | Hu .......................... G10L 15/22 |
| 2022/0223146 A1* | 7/2022 | Aili ........................ G06F 40/30 |
| 2023/0004568 A1* | 1/2023 | Wu ........................ G06N 5/041 |
| 2024/0211500 A1* | 6/2024 | Sheets ................... G06F 40/205 |

* cited by examiner (XNOR Operation)

| Descriptive Classifier Prediction | Rule-Based System Outputs at Least One Predictive Slot? | Aligns? |
|---|---|---|
| True | True | True |
| True | False | False |
| False | True | False |
| False | False | True |

FIG. 5

PARSE ARBITRATOR FOR ARBITRATING BETWEEN CANDIDATE DESCRIPTIVE PARSES GENERATED FROM DESCRIPTIVE QUERIES

TECHNICAL FIELD

The present disclosure relates to technical solutions for human-machine interfaces, and more particularly human-machine interfaces for identifying broad intent, descriptive queries by arbitrating between candidate descriptive parses.

BACKGROUND

Human-machine interfaces that allow human-machine interactions using natural language processing are becoming ubiquitous, in recent times in the form of smart devices. Such smart devices and related backend services, however, continue to have limited capabilities because they lack the technical ability to process syntactically complex commands. This technical problem is compounded by the staggering amount of information that may be applicable to any given command. The technical problem is further compounded in certain domains when the commands are more syntactically complex.

Consequently, it is oftentimes difficult for users to find relevant items among millions or possibly billions of irrelevant items based on requests. To assist with finding relevant items, search engines and recommender algorithms have been developed for a broad range of applications. Some search engines retrieve items based on which items best matched the words in a search query. However, if the request is not interpreted correctly or appropriately the results will not be satisfactory and possibly irrelevant.

Voice-controlled technologies today can be used in conjunction with search engines for discovery. In the media content delivery domain (e.g., music, video or podcast domain), for example, voice allows users to naturally express open and exploratory queries such as "play me some music for studying" or "give me directions to the best Italian restaurant nearby". It is, however, often much more difficult to perform retrieval with such descriptive queries as search engines need to compile understanding of natural language, user interests, and general and domain-specific knowledge. In the media content domain, descriptive words also do not necessarily have the same semantic meaning as they have in generic text corpuses. For example, the word "house", which refers to a building/home in a general context, refers to a genre in the music domain. Hence, models used for searching through corpuses of media content need to be trained on domain-specific data.

Search systems that consider user characteristics or information describing a situation are typically referred to as context-aware search systems. Identifying valid contextual information is challenging. Rule-based (e.g., string matching) approaches used in such systems typically use elements based on a descriptive lexicon. For example, utterances are often assigned a structure according to a grammar, i.e., the mapping of a sequence of words (utterance) into a parse tree (structured representation). However, these approaches are linguistically limited as they require a relatively precise match to a rule. Moreover, the same utterance can sometimes be mapped into more than one parse tree because of the ambiguity of natural language.

It would be useful to provide a mechanism that identifies broad intent, descriptive queries by arbitrating between candidate descriptive parses for the purpose of routing the appropriate descriptive parse to the most appropriate fulfillment service system.

SUMMARY

One example embodiment described herein involves a parse arbitrator. The parse arbitrator may comprise: a selector configured to: receive a rule-based parser predictive test result indicating whether a first <intent, slots> set contains at least one predictive slot, receive a descriptive classifier test result indicating whether the digitized descriptive query is descriptive, instruct a fulfillment system to perform a fulfillment operation based on the first <intent, slots> set when the rule-based parser predictive test result and the descriptive classifier test result align, instruct a fulfillment system to perform a fulfillment operation based on a second <intent, slots> set when the rule-based parser predictive test result and the descriptive classifier test result do not align, and wherein the first <intent, slots> set has been generated by using a first parser to parse a digitized descriptive query and the second <intent, slots> set has been generated by using a second parser to parse the digitized descriptive query.

In some embodiments, the parse arbitrator further comprises a descriptive classifier configured to generate a probability the digitized descriptive query is descriptive; wherein the first parser is a rule-based parser configured to perform a rule-based slot tagging task on the digitized descriptive query to generate the first <intent, slots> set corresponding to one or more terms in the digitized descriptive query; and wherein the second parser is a machine-learning based parser configured to apply one or more machine learning-based models on the digitized descriptive query to generate the second <intent, slots> set corresponding to one or more terms in the digitized descriptive query.

In some embodiments, the parse arbitrator further comprises a parse result evaluator configured to determine if the first <intent, slots> set has been determined by the parser.

In yet other embodiments, the parse arbitrator further comprises an alignment detector configured to detect whether the output of the descriptive classifier aligns with the first <intent, slots> set by applying an exclusive-or (XOR) operation on (i) the descriptive classifier test result and (ii) the rule-based parser predictive test result.

In some embodiments, the descriptive classifier is further operable to determine if the probability that a digitized descriptive query is descriptive meets a threshold; and set a flag if the probability meets the threshold.

In some embodiments, the one or more machine learning-based models includes a first model for predicting an intent of a term in the digitized descriptive query and a second model for predicting a slot corresponding to a term in the digitized descriptive and the second <intent, slots> set is based on a combination of a result from the first model and the second model.

In some embodiments, the selector is further configured to: route the first <intent, slots> set to a descriptive search-type fulfillment service system when the rule-based parser predictive test result and the descriptive classifier test result align; and route the second <intent, slots> set to a non-descriptive search-type fulfillment service system when the rule-based parser predictive test result and the descriptive classifier test result do not align.

Another embodiment described herein involves a parse arbitration method. The method comprises: receiving a rule-based parser predictive test result indicating whether a first <intent, slots> set contains at least one predictive slot, receiving a descriptive classifier test result indicating whether the digitized descriptive query is descriptive, instructing a fulfillment system to perform a fulfillment operation based on the first <intent, slots> set when the rule-based parser predictive test result and the descriptive classifier test result align, instructing a fulfillment system to perform a fulfillment operation based on a second <intent, slots> set when the rule-based parser predictive test result and the descriptive classifier test result do not align, and wherein the first <intent, slots> set has been generated by using a first parser to parse a digitized descriptive query and the second <intent, slots> set has been generated by using a second parser to parse the digitized descriptive query.

The method may further comprise: generating a probability the digitized descriptive query is descriptive; performing, by the first parser, a rule-based slot tagging task on the digitized descriptive query to generate the first <intent, slots> set corresponding to one or more terms in the digitized descriptive query; and applying, by the second parser, one or more machine learning-based models on the digitized descriptive query to generate the second <intent, slots> set corresponding to one or more terms in the digitized descriptive query.

In some embodiments, the method further comprises: determining a rule-based parser has determined the first <intent, slots>.

The parse arbitration method may further comprise detecting whether the output of the descriptive classifier aligns with the first <intent, slots> set by applying an exclusive-or (XOR) operation on (i) the descriptive classifier test result and (ii) the rule-based parser predictive test result.

In some embodiments, the parse arbitration method further comprises: determining if the probability that a digitized descriptive query is descriptive meets a threshold; and setting a flag if the probability meets the threshold.

The parse arbitration method may further comprise: predicting, by using a first model, an intent of a term in the digitized descriptive query; and predicting, by using a second model, a slot corresponding to a term in the digitized descriptive, wherein the second <intent, slots> set is based on a combination of a result from the first model and the second model.

The parse arbitration method, in some embodiments, may further comprise: routing the first <intent, slots> set to a descriptive search-type fulfillment service system when the rule-based parser predictive test result and the descriptive classifier test result align; and routing the second <intent, slots> set to a non-descriptive search-type fulfillment service system when the rule-based parser predictive test result and the descriptive classifier test result do not align.

In another embodiment described herein, there is provided a non-transitory computer-readable medium having stored thereon sequences of instructions, the sequences of instructions including instructions which when executed by a computer system causes the computer system to perform the methods described herein.

BRIEF DESCRIPTION OF THE DRAWINGS

The features and advantages of the example embodiments of the invention presented herein will become more apparent from the detailed description set forth below when taken in conjunction with the following drawings.

FIG. 5 depicts a truth table for determining alignment between a descriptive classifier and a rule-based parser according to an example embodiment.

DETAILED DESCRIPTION

Figure 1:
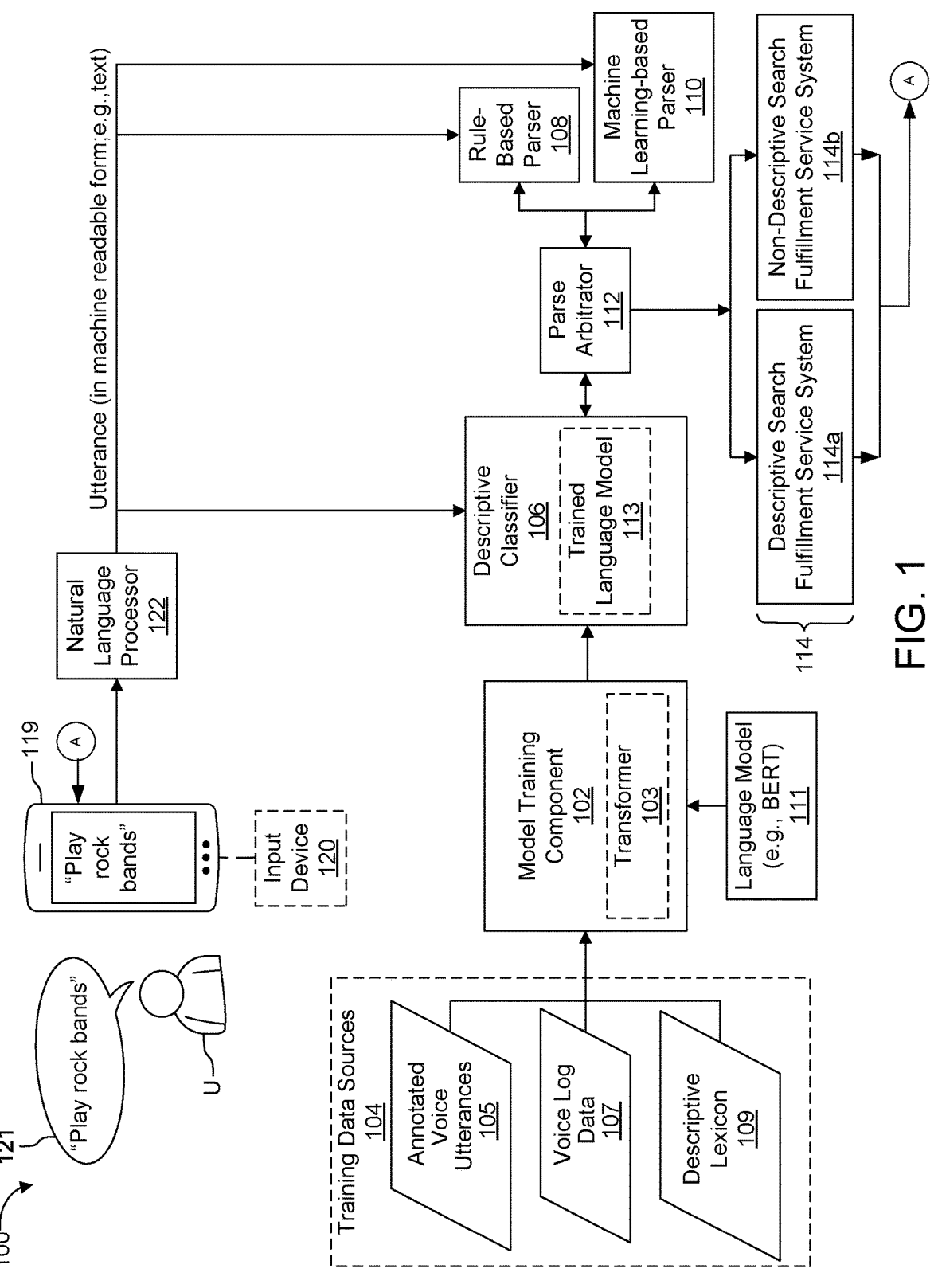
FIG. 1 depicts a system in which a parse arbitrator may be deployed.

Generally, the example embodiments presented herein are directed to systems, methods, and non-transitory computer-readable medium products for providing a parse arbitrator for arbitrating between candidate descriptive parses.

The example embodiments are primarily described in the domain of media content search, selection and delivery for all kinds of media content, such as other audio content (e.g., audiobooks or podcasts), video content (e.g., shows or movies), game content (e.g., video games), and virtual reality content, among other content. It should be appreciated, however, that principles of the present disclosure can be applied outside of media content, search selection and delivery altogether and can be generally applied to improve fulfillment of any form of descriptive query placed via a human machine interface of an item search, selection and delivery system.

Moreover, while the example embodiments described herein are primarily applied to voice-controlled systems, these embodiments can be applied to other human-machine interfaces as well, including any interface that directly receives a machine-readable version of the human-machine command (e.g., in text format via a keyboard).

An "arbitrator" as used herein generally refers to a technology stack that references a combination of one or more conditions that define various possibilities in subsequent system behavior (e.g., decision points) and determines an outcome (e.g., a final result or next instruction to be executed). For example, when a vote is split, an arbitrator can make a final decision.

A "descriptor" as used herein is a word or expression used to describe or identify something.

A "descriptive query", "open-ended query", or "open mindset search" as used herein is a type of exploratory search query that allows users to search for content by providing descriptors. In other words, it is a query used to describe or identify something to be searched. In some embodiments, a descriptive query is in the form of an utterance. In some embodiments, the descriptive query is in the form of input via a keyboard. A descriptive query can be used to describe or identify something to be searched other than a specific known item. In an example implementation, a descriptive query includes a descriptive reference to a broad category of media content. For example, a music-type media content item may have descriptive references such as a genre, an era, an aesthetic, mood, era, or a description of the activity or context that user is in (e.g., "play music for cooking", "play road trip songs", "play [Artist Name]"). Thus, a descriptive query can be used to perform a descriptive search. An individual word, letter, sound, etc. that has been digitized to form a portion of a digitized descriptive query is sometimes referred to as a "token".

A "media content item" as used herein is an item of media content, including audio, video, or other types of media content, which may be stored in any format suitable for storing media content. Non-limiting examples of media content items include tracks, music, albums, audiobooks, music videos, movies, television episodes, podcasts, other types of audio or video content, and portions or combinations thereof. Aspects of the embodiments described herein are applicable to any type of media content item.

An "utterance" refers to any speech component that is uttered or audibly expressed by a person. An utterance can be grammatical or ungrammatical, meaningful or meaningless. An utterance can include phrases, words, portions of words, letters, and vocal sounds. Phrases, words, portions of words, letters, and vocal sounds are individually and collectively sometimes referred to as a "term" or "terms", correspondingly. A "digitized utterance" is an utterance that has been converted to a string of text (or other symbols) that is machine readable. A descriptive query may be communicated via an utterance. Similarly, an example of a digitized descriptive query is a digitized utterance.

A digitized descriptive query can also be a string of terms or phrases entered manually input via an input device (e.g., using a keyboard).

As explained above, while the example embodiments described herein are primarily applied to voice-controlled systems (e.g., systems configured to receive voice utterances), the embodiments described herein can be equally applied to other types of human-machine interfaces as well, including any interface that directly receives directly a machine-readable version of the human-machine command input into a device via other now known or future developed non-voice human machine interfaces (e.g., a keyboard).

FIG. 1 depicts a system 100 in which a parse arbitrator may be deployed. System 100 includes a model training component 102 for training a language model 111 using domain specific data sources 104 such as annotated voice utterances data source 105, voice log data source 107 and a descriptive lexicon data source 109. In an example implementation, data from annotated voice utterances data source 105 are pre-labeled utterances. In another example implementation, the data from voice log data source 107 is generated by parsing sample voice data using, for example, deterministic parsers. In an example implementation, descriptive lexicon data source 109 provides a maintained list of predetermined descriptors by which listeners have described music ("hip-hop", "80s", "90s", "classical", etc.).

System 100 further includes a descriptive classifier 106, a rule-based parser 108, a machine learning (ML)-based parser 110, a parse arbitrator 112, and one or more fulfillment service systems 114 such as a descriptive search fulfillment service system 114a (e.g., a rule-based search system) and a non-descriptive search fulfillment service system 114b (e.g., an ML-based search system). System 100 further includes an input device 120 and a natural language processor 122.

Input device 120, in some embodiments, is an input device of a client device 119 such as a mobile device, client computer, smart device, and the like. User U input can include a manual input and/or a voice input. Accordingly, in some embodiments, the input device 120 includes a voice input device that operates to receive an utterance 121 from a user U (e.g., a descriptive query), and in some embodiments the input device 120 includes a manual input device that operates to receive manual input (e.g., a descriptive query).

In some embodiments, client device 119 includes a natural language processor 122, which can be used to process a descriptive query received either via spoken words or manual input.

Natural language processor 122 can be communicatively coupled to client device 119 (e.g., via a network). Natural language processor 122 operates to process spoken words or written text that natural language processor 122 receives from input device 120. In the case where the input from 120 is spoken words, natural language processor 122 may operate to perform speech-to-text processing to output text corresponding to the utterance. The result of the speech-to-text processing is a digitized utterance (e.g., a type of digitized descriptive query). Natural language processor 122 may execute additional natural language processing tasks to the text obtained from the speech-to-text processing or manually entered text obtained via the input device 120, such as by a user U typing words using a keyboard or other user interface. Such additional natural language processing tasks include language detection, information retrieval, stop word filtering, wake word detection, among others now known or future developed natural language processing tasks.

The manual input device operates to receive the manual input for controlling playback of media content via the media playback device. In some embodiments, the manual input device includes one or more buttons, keys, touch levers, switches, and/or other mechanical input devices for receiving the manual input. For example, the manual input device includes a text entry interface, such as a mechanical keyboard, a virtual keyboard, or a handwriting input device, which is configured to receive a text input, such as a text version of the user query. In addition, in some embodiments, the manual input is received for managing various pieces of information transmitted via the media playback device and/or controlling other functions or aspects associated with the media playback device.

In an example implementation, the model training component 102 trains a language model 111 that is pretrained, such as a BERT model. A BERT model is a machine learning model that is able to cope with multiple natural language processing (NLP) tasks such as supervised text classification without human supervision. BERT stands for Bidirectional Encoder Representations from Transformers.

The language model that is trained by the model training component 102, referred to as the trained language model 113, is applied by the descriptive classifier 106.

Generally, descriptive classifier 106 is used to determine if a digitized descriptive query is descriptive. In example implementations, the descriptive classifier 106 is a binary classifier that classifies utterances as descriptive or not descriptive.

In an example implementation, descriptive classifier 106 applies the trained language model 113 on the digitized descriptive query to determine whether the digitized descriptive query is descriptive or not descriptive. System 100, in some embodiments, may further include a transformer 103 that operates to finetune the BERT model. Finetuning a pretrained model further trains the model on a dataset specific to a task. In an example implementation, the task is to identify whether a descriptive query is descriptive or not descriptive. The trained language model 113, depending on the implementation, can be referred to as a model, a pretrained model or a finetuned model.

In an example embodiment, the descriptive classifier 106 operates to output a probability the digitized descriptive query is descriptive using the trained language model 113. If the probability meets a predetermined threshold, a determination is made that the term is descriptive. Otherwise, it is labeled not descriptive.

In an example implementation, descriptive classifier 106 operates to process the digitized descriptive query to determine whether it is (1) descriptive or (2) not descriptive. In an example implementation, the descriptive classifier 106 outputs a binary result (e.g., TRUE (1)/FALSE (0), where TRUE represents descriptive and FALSE represents not descriptive). This can be performed by comparing a probability generated by the descriptive classifier 106 to a predetermined threshold. If it meets the predetermined threshold the descriptive query is determined to be descriptive (i.e., descriptive classifier 106 output=TRUE (1)), otherwise the descriptive query is determined to be not descriptive (i.e., descriptive classifier 106 output=FALSE (0)).

Text parsing is a computing task that separates or splits a given sequence of characters or values (text) that comprise the digitized descriptive query into smaller components. Aspects of the embodiments described herein perform text parsing on the descriptive query. In some embodiments, text parsing involves determining the "intent" of a term (e.g., one or more tokens) in the digitized descriptive query and extracting any parameters in the digitized descriptive query. The parameters are referred to as the "slots" of the digitized descriptive query (e.g., a digitized utterance).

Slot filling, also known as slot tagging, involves identifying terms (e.g., contiguous spans of words) in a digitized descriptive query (e.g., digitized utterance) that correspond to certain parameters (e.g., slots) of a user descriptive query (e.g., an utterance). In the context of information extraction, an intent corresponds to the action or intention contained in the user's query which can be more or less explicit (e.g., "play", "stop", "rewind", "pause", "zoom"). The output of a parser is represented as one or more sets of intents and slots using the following notation <intent, slots>.

Aspects of the present invention utilize a rule-based parser 108 and a ML-based parser 110 to parse the digitized descriptive query.

In some embodiments, rule-based parser 108 performs a rule-based slot tagging task on the digitized descriptive query to generate the first <intent, slots> set corresponding to one or more terms in the digitized descriptive query. In some embodiments, the ML-based parser 110, applies one or more machine learning-based models on the digitized descriptive query to generate the second <intent, slots> set corresponding to one or more terms in the digitized descriptive query.

In an example embodiment, rule-based parser 108 is a finite-state transducer (FST) parser. In an example implementation, the FST parser operates as a deterministic parsing system that parses utterances that fit a predetermined structure. Other types of now known or future developed rule-based parsers can be used and still be within the scope of the invention.

An example ML-based parser 110 involves a machine learning model configured as an intent classifier and slot tagging model. It should be understood that other types of now known or future developed of ML-based parsers can be used and still be within the scope of the invention.

In some embodiments, rule-based parser 108 operates to apply rules that when executed by a processor, parse a digitized descriptive query (e.g., an input string of text corresponding to the digitized descriptive query). If a particular rule does not exist, the rule-based parser 108 further operates to output an indicator indicating the rule-based parser 108 is unable to understand the digitized descriptive query and therefore unable to categorize the digitized descriptive query. In some embodiments, rule-based parser 108 generates an output consisting of intents and slots using the following notation: <intent, slots>. In some embodiments, the rule-based parser will tag the intent and slots together. In some embodiments, rule-based parser 108 also outputs and indicator representing three possible outcomes: (1) no result, (2) is descriptive, and (3) is not descriptive.

ML-based parser 110 applies a trained model to parse an input string of text. In some embodiments, ML-based parser 110 generates an output consisting of intents and slots using the following notation: <intent, slots>. In some embodiments, the ML-based parser applies two machine learning (ML)-based models. In an example implementation, the ML-based models include a first model for predicting an intent of a term in the digitized descriptive query (e.g., utterance: "play something", <intent: 'PLAY'>; utterance: "show something", <intent: 'SHOW'>; utterance: "save something", <intent: 'SAVE'>; utterance "like something", <intent: 'LIKE'>; "stop", <intent: 'STOP'>) and a second model for predicting one or more slots corresponding to one or more terms in the digitized descriptive query (e.g., utterance: "play 80s rock and roll", <slots: ['era': 80s, 'genre': rock and roll]>.

In some embodiments, ML-based parser 110 also outputs and indicator representing two possible outcomes: (1) is descriptive and (2) is not descriptive.

Parse arbitrator 112 operates to receive input from descriptive classifier 106, the rule-based parser 108 and the ML-based parser 110. The rule-based parser 108 and the ML-based parser 110 can sometimes conflict. For example, the rule-based parser 108 and the ML-based parser 110 conflict when the <intent, slots> set output of the rule-based parser 108 is different from the <intent, slots> set output of the ML-based parser 110). In an example use case, the rule-based parser 108 may identify a token as a 'name' whereas the ML-based parser may identify a token as a 'descriptor'. The parse arbitrator 112 uses the output of the descriptive classifier 106 to determine an outcome. That is, the parse arbitrator 112 arbitrates by providing a final decision that is used to route the selected parser output to a fulfillment service system 114 such as descriptive search fulfillment service system 114a or non-descriptive search fulfillment service system 114b.

In an example implementation, the parse arbitrator 112 provides a fulfillment service system 114 an instruction as to which parser output to use. In some implementations, the parse arbitrator 112 provides an instruction as to which search mechanism to use by routing the parsed output to the appropriate fulfillment service system (descriptive search fulfillment service system 114a or non-descriptive search fulfillment service system 114b). For example, the parse arbitrator 112 can route the parsed output either to a descriptive search fulfillment service system 114a configured to perform a descriptive search or a non-descriptive search fulfillment service system 114b configured to perform a non-descriptive search (e.g., a catalog search). The parse arbitrator 112 can thus operate as a tie breaker mechanism that breaks a tie in the event output of the rule-based parser 108 and the output of the ML-based parser 110 conflict. Parse arbitrator can further operate to route the parsed output to one of multiple types of fulfillment systems, e.g., descriptive search fulfillment service system 114a and non-descriptive search fulfillment service system 114b based on the outcome.

In another example implementation, the descriptive search fulfillment service system 114a implements a deterministic algorithm to perform a deterministic search and the non-descriptive search fulfillment service system 114b uses an ML-model to perform a machine learning based search.

Figure 2:
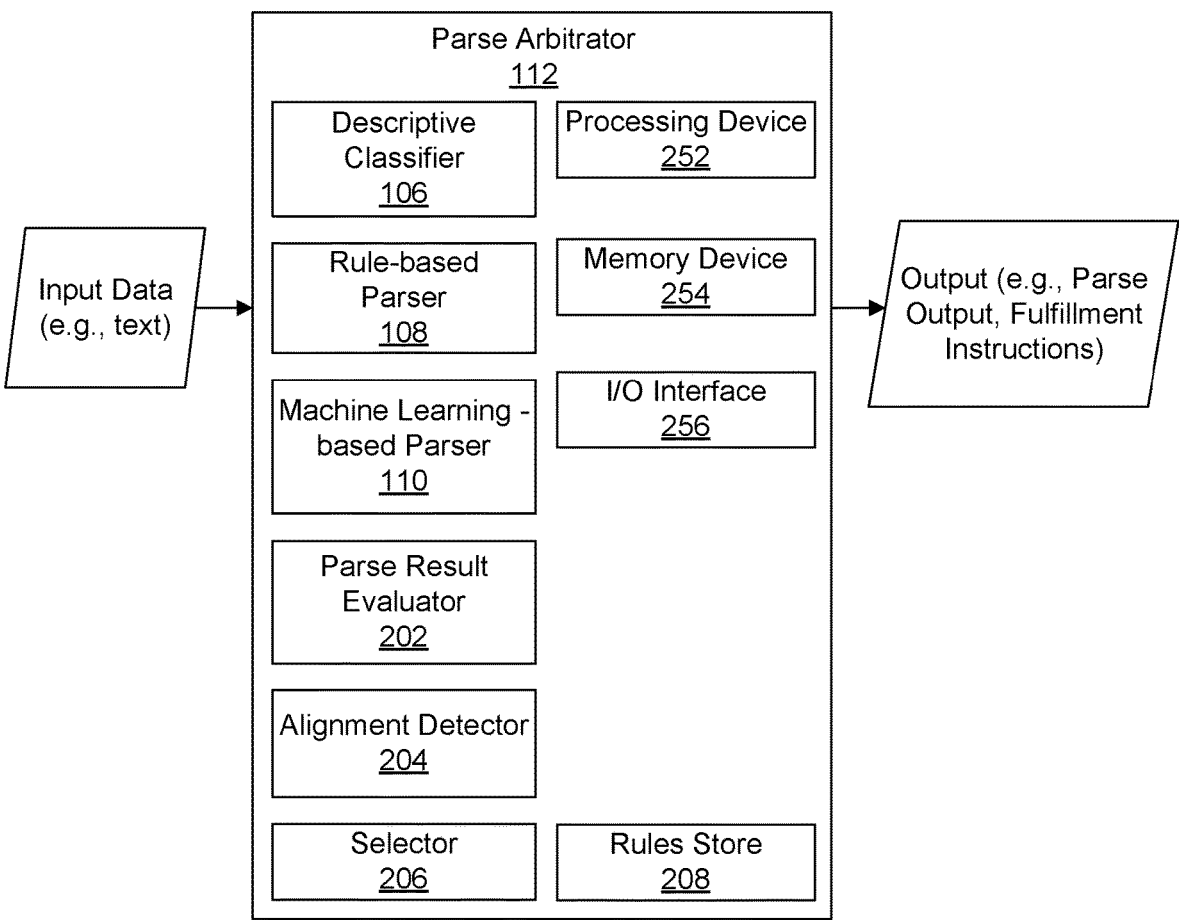
FIG. 2 depicts a parse arbitrator according to an example embodiment.

FIG. 2 depicts a parse arbitrator 112 according to an example embodiment. Parse arbitrator 112, in this example embodiment, includes a descriptive classifier 106, a rule-based parser 108, a machine-learning (ML) based parser 110, a parse result evaluator 202, an alignment detector 204, a selector 206, and a processing device 252.

In some embodiments, parse arbitrator 112 further includes a rules store 208 for storing rules that can be applied to the parsed output from the rule-based parser 108 and/or the ML-based parser 110. The rules can be executed as part of the decision-making process performed by the parse arbitrator 112.

In some embodiments, parse arbitrator 112 further includes a processing device 252, a memory device 254 and an input/output (I/O) interface 256. The processing device 252, in some embodiments, comprises one or more central processing units (CPUs). In other embodiments, the processing device 252 additionally or alternatively includes one or more digital signal processors, graphical processing units (GPUs), field-programmable gate arrays, or other electronic circuits.

The memory device 254 typically includes at least some form of non-transitory computer-readable media. Non-transitory computer-readable media includes any available media that can be accessed by the parse arbitrator 112, such as volatile and nonvolatile, removable and non-removable media implemented in any device configured to store information such as computer readable instructions, data structures, program modules, or other data. Memory device 254 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the parse arbitrator 112 in a non-transitory manner.

The memory device 254 may operate to store data and instructions. In some embodiments, the memory device 254 stores instructions for any one or a combination of the descriptive classifier 106, the rule-based parser 108, the machine-learning (ML) based parser 110, the parse result evaluator 202, the alignment detector 204, the selector 206, and the rules store 208.

I/O interface 256 includes one or more components for transferring of information between the parse arbitrator 112 and components therein and an external device or system e.g., such as natural language processor 122 or fulfillment service system 114 of FIG. 1.

In an example embodiment, descriptive classifier 106 operates to determine if a digitized descriptive query is descriptive. As described above, in some embodiments, descriptive classifier 106 can include a pre-trained model. In some embodiments descriptive classifier can include a fine-tuned model (e.g., a finetuned BERT model).

Rule-based parser 108 operates to perform a rule-based slot tagging task on the digitized descriptive query to generate an <intent, slots> set corresponding to one or more terms in the digitized descriptive query, as described above in connection with FIG. 1. For convenience, the <intent, slots> set generated by the rule-based parser 108 is sometimes referred to as a first <intent, slots> set.

In some embodiments, the rule-based parser 108 generates the first <intent, slots> set by using a finite-state transducer configured to recognize the digitized descriptive query as one or more predetermined linguistic patterns stored in a language library (e.g., a string in a particular language). The finite-state transducer transforms the portions of the digitized descriptive query to an <intent, slots> set and, in turn, outputs the <intent, slots> set. In an example implementation, when such recognition occurs, the <intent, slot> set is output along with a weight based on the strength of the linguistic pattern matching. In some embodiments, the finite-state transducer also determines the state of the transformation process (e.g., whether the finite-state transducer has determined a match. The state, also referred to sometimes as an acceptance state, is a Boolean output (e.g., TRUE (1)/FALSE (0), where TRUE represents that an <intent, slot> set has been determined and FALSE represents that an <intent, slot> set has not been determined).

Machine learning (ML)-based parser 110 operates to apply one or more machine-based models on the digitized descriptive query to generate another <intent, slots> set corresponding to one or more terms in the digitized descriptive query, as described above in connection with FIG. 1. For convenience, the <intent, slots> set generated by the ML-based parser 110 is sometimes referred to as a second <intent, slots> set.

Parse result evaluator 202 operates to determine whether the rule-based parser 108 has obtained an <intent, slots> set (e.g., a first <intent, slots> set). In some embodiments, parse result evaluator 202 is contained within rule-based parser 108. That is, the parse result evaluator 202 determines the state of the rule-based parser 108 results. The state, also referred to sometimes as an acceptance state, is a Boolean output (e.g., TRUE (1)/FALSE (0), where TRUE represents that an <intent, slot> set has been determined and FALSE represents that an <intent, slot> set has not been determined).

Generally, alignment detector 204 operates to detect, when a <intent, slots> set of the rule-based parser 108 (i.e., the first <intent, slots> set) has been determined, whether the output of the descriptive classifier 106 aligns with the <intent, slots> set determined by the rule-based parser (i.e., the first <intent, slots> set).

In an example implementation, alignment detector 204 detects whether the output of the descriptive classifier aligns with the first <intent, slots> set by applying an exclusive-or (XOR) operation on (i) the descriptive classifier test result and (ii) the rule-based parser predictive test result. An alignment determination operation according to this example implementation will now be described with reference to FIG. 5.

FIG. 5 depicts a truth table 500 for determining alignment between output of the descriptive classifier 106 and output of the rule-based parser 108, according to an example embodiment. As explained above, the descriptive classifier 106 operates to predict the descriptiveness of a digitized descriptive query. Descriptiveness is a probability that an utterance received from a user U is descriptive (e.g., an above-threshold confidence indicating a description of the media content item is contained in the utterance). The rule-based parser 108 generates an <intent, slots> set. In some embodiments, the output of the descriptive classifier 106 is based on a portion of the tokens that comprise a descriptive query. That is, the output of the descriptive classifier 106 indicating whether a descriptive exists can be determined by comparing one or more slots of the <intent, slots> set (e.g., where slots include: activity, aesthetic, mood, genre, era, etc.) to a list of predefined slots.

When the descriptive classifier 106 outputs a high confidence (e.g., a probability above a predetermined threshold) that one or more of the slots is a descriptive-type reference to a particular type of media content item (i.e., there is a description), then a determination is made whether the output of the descriptive classifier 106 and the output of the rule-based parser 108 are aligned. If the rule-based parser 108 outputs at least one slot that the descriptive classifier 106 has determined is descriptive, then a determination is made that the output of the descriptive classifier 106 and the output of the rule-based parser 108 are aligned, as shown in the first row of the truth table 500 (i.e., descriptive classifier prediction=TRUE, rule-based parser 108 (At least one predictive slot?: TRUE, alignment=TRUE).

If the descriptive classifier 106 outputs a high confidence that one or more of the slots is a descriptive-type reference to a particular type of media content item and the rule-based parser 108 does not output any descriptors, then a determination is made that the output of the descriptive classifier 106 and the output of the rule-based parser 108 are not aligned, as shown in the second row of the truth table 500 (i.e., descriptive classifier prediction=TRUE, rule-based parser 108 (at least one predictive slot?: FALSE, Alignment=FALSE).

If the descriptive classifier 106 does not output a high confidence that one or more of the slots is a descriptive-type reference to a particular type of media content item and the rule-based parser 108 does output descriptors, then a determination is made that the output of the descriptive classifier 106 and the output of the rule-based parser 108 are not aligned, as shown in the third row of the truth table 500 (i.e., descriptive classifier prediction=FALSE, rule-based parser 108 (at least one predictive slot?: TRUE, Alignment=FALSE).

If the descriptive classifier 106 outputs a low confidence that one or more of the slots is a descriptive-type reference to a particular type of media content item and the rule-based parser 108 does not predict any slots (i.e., rule-based parser 108 supplies no parses), then a determination is made that the output of the descriptive classifier 106 and the output of the rule-based parser 108 are deemed to be aligned, as shown by the fourth row of the truth table 500 (i.e., descriptive classifier prediction=FALSE, rule-based parser 108 (at least one predictive slot?: FALSE, Alignment=TRUE).

The parse arbitrator 112 selects a fulfillment service system 114 based on the outcome of the alignment test.

In some embodiments, selector 206 receives a test result (referred to as a rule-based parser predictive test result) indicating whether a first <intent, slots> set contains at least one predictive slot. Selector 206 further receives another test result (referred to as a descriptive classifier test result) indicating whether the digitized descriptive query is descriptive. In turn, selector 206 instructs a fulfillment system to perform a fulfillment operation based on the first <intent, slots> set when the rule-based parser predictive test result and the descriptive classifier test result align. Alternatively, selector instructs a fulfillment system to perform a fulfillment operation based on a second <intent, slots> set when the rule-based parser predictive test result and the descriptive classifier test result do not align. In this example embodiment, the first <intent, slots> set has been generated by using a first parser to parse a digitized descriptive query and the second <intent, slots> set has been generated by using a second parser to parse the digitized descriptive query.

In some embodiment, selector 206 operates to select the first <intent, slots> set (i.e., a rule-based determination) and the output of the descriptive classifier aligns with the first <intent, slots> set.

Selector 206 can also operate to select the second <intent, slots> set (ML based prediction) when the first <intent, slots> set has not been determined. Selector 206 can further operate to instruct a fulfillment system (e.g., fulfillment service system 114 of FIG. 1) based on the selection of the first <intent, slots> set or the second <intent, slots> set.

In some embodiments, descriptive classifier 106 further operates to determine if the probability that a digitized descriptive query is descriptive meets a threshold and to set a flag if the probability meets the threshold.

In an example implementation, the machine-based models include a first model for predicting an intent of a term (e.g., one or more tokens) in the digitized descriptive query and a second model for predicting a slot corresponding to a term in the digitized descriptive query.

In some embodiments, descriptive classifier 106 applies a pre-trained model. The pre-trained model provides a true/false result based on the words in the digitized descriptive query and their context. The model uses information about each individual word (e.g., a context of each word within the digitized descriptive query, the location of each word, etc.) to create a single vector representation for each word in the digitized descriptive query. In an example implementation, these steps are part of a pre-trained model that is loaded (small BERT).

In some embodiments, the pre-trained model is finetuned on a combination of annotated voice utterances, log data from static rule based matching approaches and on a descriptor lexicon. The output vectors from BERT are fed to another layer and eventually pooled into a representation of the entire digitized descriptive query. This final representation is input into the last part of the model, which creates a probability of whether the digitized descriptive query is descriptive or not. The entire process happens within the model architecture itself.

The probability results in a signal that is applied using the arbitration methodology to selects from one of two parsing systems for open-mindset queries. This enables the system to detect and route a wider range of descriptive queries that may be more syntactically or morphologically complex.

Figure 3:
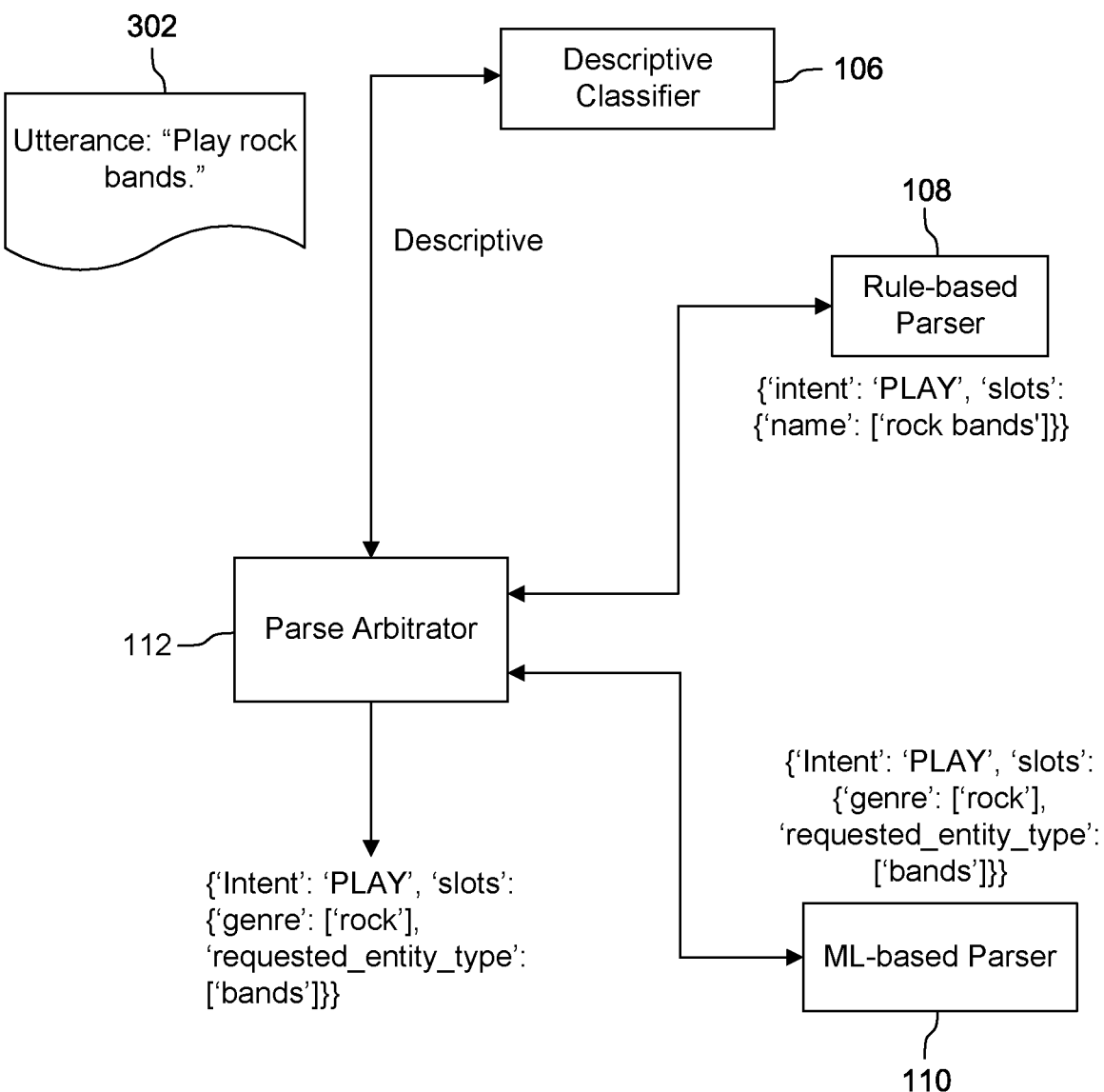
FIG. 3 illustrates an example parse arbitration use case.

FIG. 3 illustrates an example parse arbitration use case. Particularly, FIG. 3 illustrates Example 3 described below. In the example, the utterance 302 is "Play rock bands". The utterance 302 "Play rock bands" is a problematic descriptive request because a typical parser system in the media content domain will look for artist, tracks, or podcasts called "rock music" instead of looking for music in the rock music genre.

Referring also to FIG. 2, in some embodiments, the trained language model 113 of the descriptive classifier 106 is applied to entire digitized descriptive query. Inside the trained language model 113 of the descriptive classifier 106, information about each of the three words, along with contextual information (position of the words in the digitized descriptive query, which words appear next to each other, etc.) is used to create a vector representation for each word of the digitized descriptive query (e.g., via BERT). These per-word vectors are pooled together by a separate layer to create a single vector representation of the digitized descriptive query. This representation is fed to a final layer that outputs a probability of whether the digitized descriptive query is descriptive or not descriptive. In this example ("Play rock bands"), the probability is high that the digitized descriptive query is descriptive. Therefore, the digitized descriptive query would be classified as descriptive by the descriptive classifier 106 and the output of the descriptive classifier 106 would be TRUE.

Rule-based parser 108 parses the digitized descriptive query "Play rock bands" and generates the following output: <intent: 'PLAY', slots: ['name': rock bands]. That is, the two tokens "rock" and "bands" have been tagged by the rule-based parser 108 as 'name'. ML-based parser 110 parses the digitized descriptive query "Play rock bands" as well but generates a different output: <intent: 'PLAY', slots: ['genre': rock, 'requested_entity_type': bands]>. That is, the ML-based parser 110 has tagged the token "rock" as 'genre' and the token 'bands" as 'requested_entity_type' (i.e., the type of entity that the user is requesting to be listened to.

Because 'genre' is a type of descriptor, the ML-based parser 110 is considered having a descriptive parse. The output of the rule-based parser, 'name', is not a descriptor. In this example, the two parsing systems are therefore in conflict. As will be explained in more detail below, because the output of the descriptive classifier 106 is TRUE, the parse arbitrator 112 uses the ML-based parse output by ML-based parser 110 and the <intent, slots> set (e.g., the second <intent, slots> set) is fed to the fulfillment service system 114 of FIG. 1.

Figure 4:
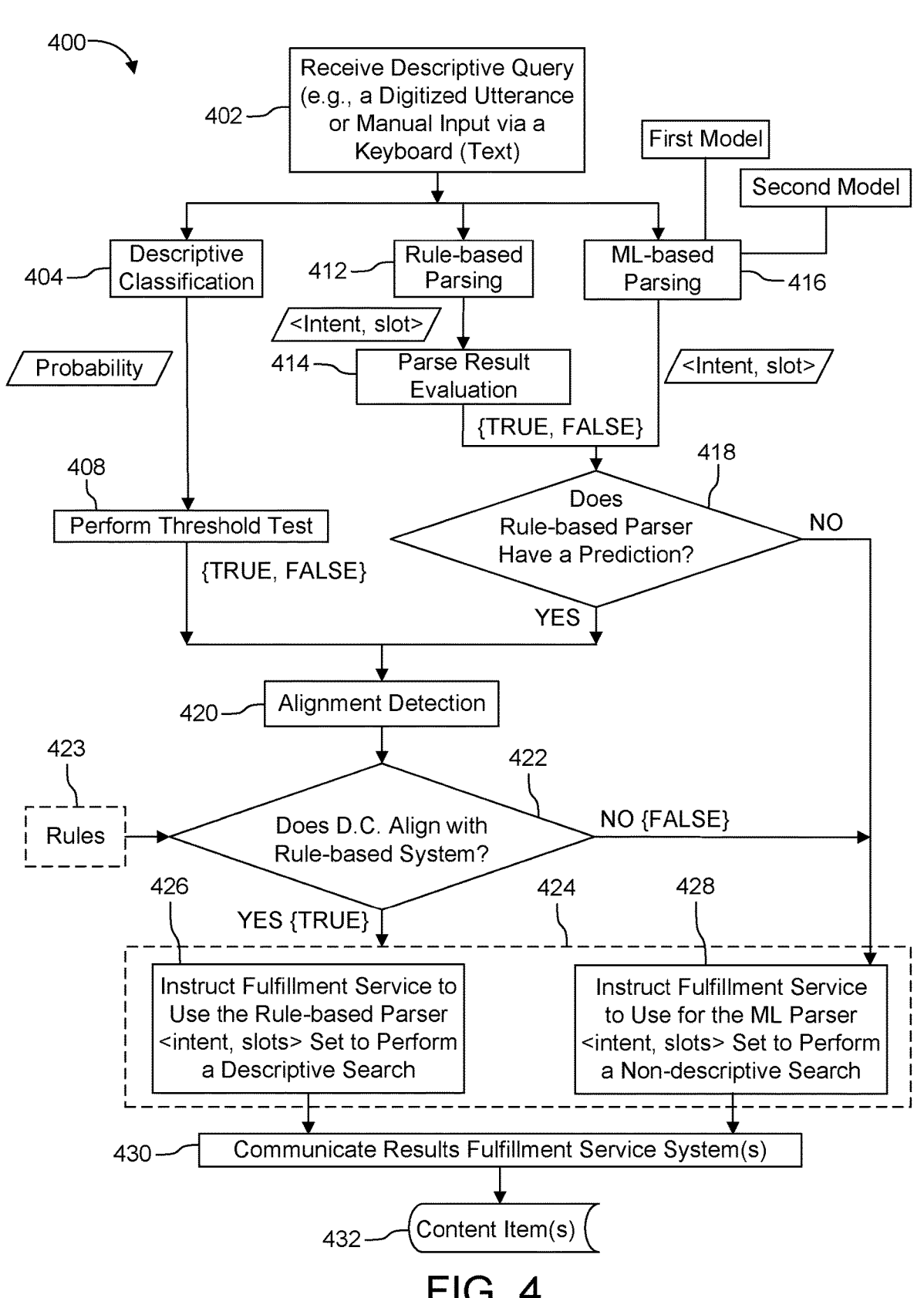
FIG. 4 depicts an arbitration process 400 for performing parse arbitration in accordance with an example embodiment.

FIG. 4 depicts an arbitration process 400 for performing parse arbitration in accordance with an example embodiment. In an example embodiment, a descriptive query receiving operation 402 performs receiving a digitized descriptive query. In an example implementation, the digitized descriptive query is based on an utterance from User U of FIG. 1 that has been digitized into a format that is machine readable (e.g., into text). A descriptive classifier determination operation 404 performs determining whether the digitized descriptive query is descriptive. In an example implementation, descriptive classifier determination operation 404 is performed by descriptive classifier 106 of FIGS. 1 and 2.

In an example implementation, the descriptive classifier determination operation 404 generates a probability indicating the probability the digitized descriptive query is descriptive. In turn, a descriptive classifier probability threshold test operation 408 performs a threshold test against a predetermined threshold. If the probability meets the predetermined threshold, then the output of the descriptive classifier probability threshold test operation 408 is TRUE. Otherwise, the output of the descriptive classifier probability threshold test operation 408 is FALSE.

In some implementations, a value representing an <intent, slots> is generated as follows. A vector encoding of each utterance is created. In turn, the vector encoding is processed by the ML model and eventually fed to the last layer of the ML model which outputs a probability between 0 and 1. This probably is compared against a configurable threshold which is set to a predetermined number, for example, to 0.5. The predetermined number can be set as a default threshold.

A rule-based parsing operation 412 performs a rule-based slot tagging task on the digitized descriptive query to generate a first <intent, slots> set corresponding to one or more terms in the digitized descriptive query. In turn, a parse result evaluation operation 414 determines if a first <intent, slots> set has been obtained (i.e., if the rule-based parser has determined an <intent, slots>).

In an example implementation, the parse result evaluation operation 414 is performed by parse result evaluator 202 of FIG. 2. In another example implementation, the parse result evaluation operation 414 described above is performed by the rule-based parser 108 of FIG. 2.

A ML-based parsing operation 416 performs applying one or more machine learning-based models on the digitized descriptive query to generate a second <intent, slots> set corresponding to one or more terms in the digitized descriptive query.

In some embodiments, the descriptive classifier determination operation 404, the rule-based parsing operation 412, and the machine-learning based parsing operation 416 are executed substantially in parallel. In some embodiments, the descriptive classifier determination operation 404, the rule-based parsing operation 412, and the ML-based parsing operation 416 are executed substantially sequentially.

In an example implementation, parse result evaluation operation 414 performs determining whether the rule-based parser has a prediction by comparing the slots of the <intent, slots> set generated by the rule-based parser 108 of FIGS. 1 and 2 against a predetermined list of descriptors (e.g., activity, aesthetic, mood, genre, era, etc.). The output corresponding to the prediction can be in a binary format (e.g., {TRUE/FALSE}).

If a determination is made at rule-based parser prediction test 418 that the output of the rule-based parsing operation 412 has a prediction (e.g., the output of the parse result evaluation operation 414 is TRUE), an alignment detection operation 420 is performed. The alignment detection operation 420 performs detecting whether the output of the descriptive classifier aligns with the <intent, slots> output by the rule-based parsing operation 412. In an example embodiment, a determination is made by an alignment test operation 422 whether the output of the descriptive classifier aligns with the first <intent, slots> set. If so, a selection operation 424 is performed.

Selection operation 424 performs selecting the first <intent, slots> set (i.e., the output of the rule-based parsing operation 412) when the rule-based parser prediction test 418 is YES and the output of the descriptive classifier aligns with the first <intent, slots> set (alignment test operation 422 result is YES). In an example implementation, the selection operation 424 is performed by selector 206 of FIG. 2.

The selection operation 424 performs selecting the <intent, slots> set obtained from the ML-based parser operation when rule-based parser prediction test 418 determines an <intent, slots> set of the rule-based parsing operation (also referred to as the first <intent, slots> set) has not been determined.

When the descriptive classifier determination operation 404 outputs a probability indicating the digitized descriptive query is descriptive (i.e., the output of descriptive classifier probability threshold test operation 408 is TRUE) and the <intent, slots> set from the rule-based parsing operation 412 has been determined (i.e., parse result evaluation operation 414 is TRUE and rule-based parser prediction test 418 is YES), and the output of the descriptive classifier aligns with the first <intent, slots> set (alignment test operation 422 result is YES) instruction operation 426 performs instructing a fulfillment system to use a rule-based prediction mechanism. When the <intent, slots> set of the rule-based parser (e.g., the first <intent, slots> set) has not been determined an instruction operation 428 performs instructing the fulfillment system to use an ML-based prediction mechanism. A communications operation 130, in turn, communicates the results to the corresponding fulfillment service.

Communicating the results of the rule parsers to a fulfillment service system causes the fulfillment service system to return one or more content items 432. In some embodiments, the fulfillment service system 114 to which an <intent, slots> set was communicated operates to communicate the results to the device that originally received a descriptive query (e.g., utterance or manually entered descriptive query) from a user U. In an example implementation in the domain of media content, the results may be a playlist identifying one or more content items that can be selected for playback via the client device 119 of FIG. 1.

In some embodiments, ML-based parsing operation 416 performs two prediction operations, a first prediction operation and a second prediction operation. ML-based parsing operation 416 applies a first model to perform predicting an intent of a term in the digitized descriptive query and a second prediction operation applies a second model to perform predicting a slot corresponding to a term in the digitized descriptive query. In turn, the <intent, slots> set output by the ML-based parsing operation (e.g., the second <intent, slots> set) is based on a combination of the results from applying the first model and the second model.

In an example implementation, processing device 252 applies one or more rules 423 (e.g., stored in rules store 208 of FIG. 1) that are used to decide whether to disregard that a parsed output is identified as descriptive or not descriptive and route the parse arbitrator based on the one or more rule. For example, certain tokens (e.g., words or phrases) when applied to rules 423 cause the processing device 252 to route the parsed output to one fulfilment system or the other, regardless whether the utterance is determined by descriptive classifier determination operation 404 to be descriptive.

The following are examples outputs from the parsing systems (i.e., the rule-based parser 108 and the ML-based parser 110) and the descriptive classifier 106:

EXAMPLE 1

Utterance: "Play 70s rock"
Rule-based parser 108 parse output: <intent: 'PLAY', slots: ['genre': rock, 'era': 70s]>
ML-based parser 110 parse output: <intent: 'PLAY', slots: ['genre': rock, 'era': 70s]
Descriptive Classifier 106 output: TRUE In Example 1, the parse arbitrator has identified the utterance as descriptive because it has a 'genre' slot which is a type of descriptor (i.e., operation 408=TRUE; rule-based parser prediction test 418=TRUE}, therefore no additional parses are required and the utterance is considered descriptive.

EXAMPLE 2

Utterance: "Play acid jazz"
Rule-based parser 108 parse output: <'intent': 'PLAY', 'slots': ['genre': acid jazz]
ML-based parser 110 parse output: 'intent': 'PLAY', 'slots': ['genre': jazz, 'descriptor': acid]
Descriptive Classifier 106 output: TRUE In Example 2, the parse arbitrator 112 has identified the utterance as descriptive because it has a 'genre' slot which is a type of descriptor (i.e., operation 408=TRUE; rule-based parser prediction test 418=TRUE}, therefore no additional parses are required and the utterance is considered descriptive. The <intent, slots> set is, in turn, transmitted to a descriptive search fulfillment service system 114a that performs a descriptive search.

EXAMPLE 3

Utterance: "Play rock bands"
Rule-based parser 108 parse output: <intent: 'PLAY', slots: ['name': rock bands]

ML-based parser 110 parse output: <intent: 'PLAY', slots: ['genre': rock, 'requested_entity_type': bands]>
Descriptive Classifier 106 output: TRUE As shown in example 3, 'name' as output by the rule-based parser 108 is not a descriptor and therefore the output of the rule-based parser 108 is false. 'genre', as output by the ML-based parser, is a type of descriptor. Therefore, the rule-based parser 108 and the ML-based parser 110 are in conflict. Because the descriptive classifier 106 has determined that the utterance is descriptive, the <intent, slots> set is, in turn, transmitted to a non-descriptive search fulfillment service system 114b that performs an ML-based search.

EXAMPLE 4

Utterance: "Play slack-key guitar music"
Rule-based parser 108 parse output: <intent: 'PLAY', slots: ['name': slack-key guitar, 'requested_entity_type': music]
ML-based parser 110 parse output: <intent:'PLAY', slots: ['descriptor': 'slack-key guitar', 'requested_entity_type':music]>
Descriptive Classifier 106 output: TRUE Here both the rule-based parser 108 output and the descriptive classifier 106 output have determined that their respective outputs are descriptive. Therefore, the rule-based parser 108 <intent, slots> set is, in turn, transmitted to a descriptive search fulfillment service system 114a that performs a descriptive search.

EXAMPLE 5

Utterance: "Slowed and reverb music"
Rule-based parser 108 parse output: <intent: 'NO_IN-TENT', slots: ['genre': slowed and reverb, 'requested_entity_type': music]>
ML-based parser 110 parse output: <intent:'NO_IN-TENT', slots:['name']: [slowed and reverb], 'requested_entity_type': music]>
Descriptive Classifier 106 output: FALSE In example 5, the descriptive classifier 106 output has determined that the utterance is not descriptive. Therefore, the rule-based parser 108 <intent, slots> set is, in turn, transmitted to a descriptive search fulfillment service system 114a that performs a descriptive search. Notably the results are counterintuitive. Even though the rule-based parser 108 output and ML-based parser 110 output matched the descriptive classifier 106 output (i.e., nothing indicates that any portion of the utterance is descriptive), the descriptive search fulfillment service system is selected.

EXAMPLE 6

Utterance: "Play ARTIST NAME"
Rule-based parser 108 parse output: <intent: 'PLAY', slots: ['name': ARTIST NAME]>
ML-based parser 110 parse output: <intent: 'PLAY', slots: ['name': ARTIST NAME]>
Descriptive Classifier 106 output: N/A In example 6, the parser models, rule-based parser 108, ML-based parser 110 and descriptive classifier 106 have determined that the utterance is not descriptive. The output of the descriptive classifier 106 is not needed to arbitrate this example use case. Therefore, the rule-based parser 108 <intent, slots> set is, in turn, transmitted to a descriptive search fulfillment service system 114a that performs a descriptive search.

The example embodiments of the invention may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a processing device 252 typically includes one or more components, such as one or more microprocessors, for performing the arithmetic and/or logical operations required for program execution, and storage media, such as one or more memory cards (e.g., flash memory) for program and data storage, and a random-access memory, for temporary data and program instruction storage. From a software standpoint, processing device 252 typically includes software resident on a storage media (e.g., a memory card), which, when executed, directs the processing device 252 in performing transmission and reception functions. The processing device software may run on an operating system stored on the storage media, such as, for example, UNIX, iOS, Windows, Linux, and the like, and can adhere to various protocols such as the Ethernet, ATM, TCP/IP protocols and/or other connection or connectionless protocols. As is well known in the art, processing devices can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

Although processing device 252 is shown as being a single processing device, in other example embodiments processing device 252 may include plural separate processing devices, wherein each is dedicated to a separate application, such as, for example, a data application, a voice application, and a video application.

Software embodiments of the example embodiments presented herein may be provided as a computer program product, or software, that may include an article of manufacture on a machine accessible or machine-readable medium having instructions. The instructions on the machine accessible or machine-readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The performance of the one or more actions enables enhanced and automated selection and output of the data corresponding to the one or more entities (e.g., people, places, and things) from the context in which the data has been generated and stored by virtue of the entity or node relationships with other entities or nodes. This means that data which is selected and output according to the processes described herein are of enhanced contextual relevance and in this regard can be automatically selected and output at significantly improved rates, for example the throughput of data selection to its output, or speed of data selection is significantly enhanced. The data which is automatically selected and output according to the processes described herein can thus be pre-emptively obtained and stored locally within a computer, or transmitted to the computer, such that the selected data is immediately accessible and relevant to a local user of the computer.

In addition, not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures. Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A computer-implemented method comprising:

receiving, from a descriptive classifier, an indication of whether a textual input query is non-descriptive or descriptive, wherein the textual input query was obtained by way of a client device and includes one or more terms, wherein non-descriptive text identifies a specific known media content item, and wherein descriptive text identifies a category of media content items;

receiving, from a rule-based parser, a first parse output of the textual input query, wherein the rule-based parser tags the one or more terms based on rules to identify the first parse output;

receiving, from a machine-learning-based parser, a second parse output, wherein the machine-learning-based parser tags the one or more terms based on one or more trained models to identify the second parse output;

based on at least (i) the indication from the descriptive classifier of whether the textual input query is non-descriptive or descriptive, and (ii) the first parse output from the rule-based parser, selecting a search system from either a rule-based descriptive search system or a machine-learning-based non-descriptive search system;

routing one of the first parse output or the second parse output to the search system, wherein the first parse output is routed when the rule-based descriptive search system is selected, and wherein the second parse output is routed when the machine-learning-based non-descriptive search system is selected;

receiving, from the search system, a representation of one or more media content items; and providing, to the client device, the representation of the one or more media content items.

2. The computer-implemented method of claim 1, wherein the rule-based descriptive search system is selected when the indication is aligned with the first parse output, and wherein the machine-learning-based non-descriptive search system is selected when the indication is not aligned with the first parse output.

3. The computer-implemented method of claim 2, wherein the indication is aligned with the first parse output when both represent that the textual input query is descriptive or when both represent that the textual input query is non-descriptive, and wherein the indication is not aligned with the first parse output when one represents that the textual input query is descriptive and the other represents that the textual input query is non-descriptive.

4. The computer-implemented method of claim 1, wherein the indication is used as a tie breaker when one the first parse output and the second parse output is descriptive and the other of the first parse output and the second parse output is non-descriptive.

5. The computer-implemented method of claim 1, wherein the first parse output includes a first intent and a first set of parameters, and wherein the second parse output includes a second intent and a second set of parameters.

6. The computer-implemented method of claim 5, wherein the first intent and the second intent relate to actions to be performed with respect to the one or more media content items.

7. The computer-implemented method of claim 1, wherein the indication is a binary indication of whether the textual input query is non-descriptive or descriptive.

8. The computer-implemented method of claim 1, wherein the indication is a probabilistic indication of whether the textual input query is non-descriptive or descriptive.

9. The computer-implemented method of claim 1, wherein the one or more trained models of the machine-learning-based parser includes a first model for predicting an intent of the textual input query and a second model for predicting further parameters of the textual input query.

10. The computer-implemented method of claim 1, wherein the first parse output or the second parse output is descriptive when it refers to a genre, an era, a mood, or a description of a user activity.

11. The computer-implemented method of claim 1, wherein the representation of the one or more media content items comprises a playlist, and wherein the one or more media content items include one or more of music tracks, audio books, or podcasts.

12. The computer-implemented method of claim 1, wherein the descriptive classifier, the rule-based parser, and the machine-learning-based parser are executed at least partially in parallel.

13. A non-transitory computer-readable medium, storing program instructions that, when executed by one or more processors of a computing system, cause the computing system to perform operations comprising:

receiving, from a descriptive classifier, an indication of whether a textual input query is non-descriptive or descriptive, wherein the textual input query was obtained by way of a client device and includes one or more terms, wherein non-descriptive text identifies a specific known media content item, and wherein descriptive text identifies a category of media content items;

receiving, from a rule-based parser, a first parse output of the textual input query, wherein the rule-based parser tags the one or more terms based on rules to identify the first parse output;

receiving, from a machine-learning-based parser, a second parse output, wherein the machine-learning-based parser tags the one or more terms based on one or more trained models to identify the second parse output;

based on at least (i) the indication from the descriptive classifier of whether the textual input query is non-descriptive or descriptive, and (ii) the first parse output from the rule-based parser, selecting a search system from either a rule-based descriptive search system or a machine-learning-based non-descriptive search system;

routing one of the first parse output or the second parse output to the search system, wherein the first parse output is routed when the rule-based descriptive search system is selected, and wherein the second parse output is routed when the machine-learning-based non-descriptive search system is selected;

receiving, from the search system, a representation of one or more media content items; and providing, to the client device, the representation of the one or more media content items.

14. The non-transitory computer-readable medium of claim 13, wherein the rule-based descriptive search system is selected when the indication is aligned with the first parse output, and wherein the machine-learning-based non-descriptive search system is selected when the indication is not aligned with the first parse output.

15. The non-transitory computer-readable medium of claim 14, wherein the indication is aligned with the first parse output when both represent that the textual input query is descriptive or when both represent that the textual input query is non-descriptive, and wherein the indication is not aligned with the first parse output when one represents that the textual input query is descriptive and the other represents that the textual input query is non-descriptive.

16. The non-transitory computer-readable medium of claim 13, wherein the indication is used as a tie breaker when one the first parse output and the second parse output is descriptive and the other of the first parse output and the second parse output is non-descriptive.

17. The non-transitory computer-readable medium of claim 13, wherein the first parse output includes a first intent and a first set of parameters, and wherein the second parse output includes a second intent and a second set of parameters.

18. The non-transitory computer-readable medium of claim 13, wherein the indication is a binary indication of whether the textual input query is non-descriptive or descriptive.

19. The non-transitory computer-readable medium of claim 13, wherein the one or more trained models of the machine-learning-based parser includes a first model for predicting an intent of the textual input query and a second model for predicting further parameters of the textual input query.

20. A computing system comprising:

one or more processors;

memory; and program instructions, stored in the memory, that upon execution by the one or more processors cause the computing system to perform operations comprising:

receiving, from a descriptive classifier, an indication of whether a textual input query is non-descriptive or descriptive, wherein the textual input query was obtained by way of a client device and includes one or more terms, wherein non-descriptive text identifies a specific known media content item, and wherein descriptive text identifies a category of media content items;

receiving, from a rule-based parser, a first parse output of the textual input query, wherein the rule-based parser tags the one or more terms based on rules to identify the first parse output;

receiving, from a machine-learning-based parser, a second parse output, wherein the machine-learning-based parser tags the one or more terms based on one or more trained models to identify the second parse output;

based on at least (i) the indication from the descriptive classifier of whether the textual input query is non-descriptive or descriptive, and (ii) the first parse output from the rule-based parser, selecting a search system from either a rule-based descriptive search system or a machine-learning-based non-descriptive search system;

routing one of the first parse output or the second parse output to the search system, wherein the first parse output is routed when the rule-based descriptive search system is selected, and wherein the second parse output is routed when the machine-learning-based non-descriptive search system is selected;

receiving, from the search system, a representation of one or more media content items; and providing, to the client device, the representation of the one or more media content items.

* * * * *